June 30, 1970  A. R. HURST  3,518,158

RELEASE SHEET OR WEB HAVING A PRINTABLE SURFACE

Filed Oct. 31, 1968

Inventor:
Alan R. Hurst
By Hofgren, Wegner,
Allen, Stellman & McCord
Attys

United States Patent Office 3,518,158
Patented June 30, 1970

3,518,158
RELEASE SHEET OR WEB HAVING A PRINTABLE SURFACE
Alan R. Hurst, Hinsdale, Ill., assignor to ARHCO, Inc., a corporation of Illinois
Filed Oct. 31, 1968, Ser. No. 772,118
Int. Cl. C09j 7/02; B32b 7/06
U.S. Cl. 161—208    7 Claims

ABSTRACT OF THE DISCLOSURE

A laminate useful as a release sheet or web having a heavy paper layer with a silicone release coating, a polyethylene film layer bonded to the reverse surface of the heavy paper layer and a thin sheet or layer of printable paper bonded to the polyethylene layer. A second polyethylene film layer is preferably secured to the release side of the paper before applying the release coating. The resulting laminate is useful as a release web, e.g., for contacting, carrying and releasing tacky adhesive coated surfaces in the manufacture of labels or the like. The printable paper provides an exposed back surface for printing instructions, logos and the like.

BACKGROUND OF THE INVENTION

Field of the invention

This invention relates to release sheets or webs and especially to a release sheet or web having a printable reverse surface.

Description of the prior art

Release webs and papers have previously been provided and are currently in use in a wide variety of manufacturing processes, usually for transferring or conveying tacky adhesives and/or adhesive coated sheets. However, such release sheets or webs usually have a number of disadvantages. For example, many such sheets are susceptible to a high degree of curl on storage or in use, especially where they are composed of paper coated on one surface with polyethylene or the like. Where a polyethylene coating is provided on both surfaces of the paper in an attempt to control or prevent curl, the structure has no easily printable surface for printing instructions, logos, and the like.

Often release sheets are provided with silicone coatings to improve the release properties. However, when such webs are stored in roll form, a normal practice, the reverse side of the web can pick up silicone coating material and can later objectionably transfer it elsewhere during use of the web.

The polyethylene or like surface backings on the release sheet or web are temperature-sensitive and can be damaged by contacting heated surfaces such as hot idlers and the polyethylene can even stick to such surfaces and pull loose from the web or cause tearing of the web. Also, during die cutting operations, the surface polyethylene tends to string as the die passes through it, resulting sometimes in an uneven edge. In other use operations, the release sheets are normally limp and it is difficult to initiate a separation of the release sheet from a pressure-sensitive adhesive layer.

In addition to the above disadvantages, the curl-resistant double coated polyethylene release sheets involve an expensive method of manufacture with one polyethylene layer being extruded onto the sheet in conjunction with a matte surface chill roll and the other layer being extruded onto the opposite surface in conjunction with a gloss or a smooth surface chill roll to provide a smooth surface to receive a silicone coating, requiring the changing of chill rolls between operations or the expense of two chill roll extruders.

SUMMARY OF THE INVENTION

The present invention provides a release web including a flexible web substrate, a plastic film on at least one surface of the substrate, a release coating on the substrate, and a surface print receiving layer secured to the plastic film on the reverse surface. Preferably a second plastic film is provided between the release coating and substrate, the print receiving layer is absorbent, non-stringing and heat resistant relative to the plastic films.

While this invention is susceptible of embodiment in many different forms, there is shown in the drawing and will herein be described in detail a specific embodiment of the invention with the understanding that the present disclosure is to be considered as an exemplification of the principles of the invention and is not intended to limit the invention to the embodiment illustrated.

DESCRIPTION OF THE PREFERRED EMBODIMENTS

Figure 1:
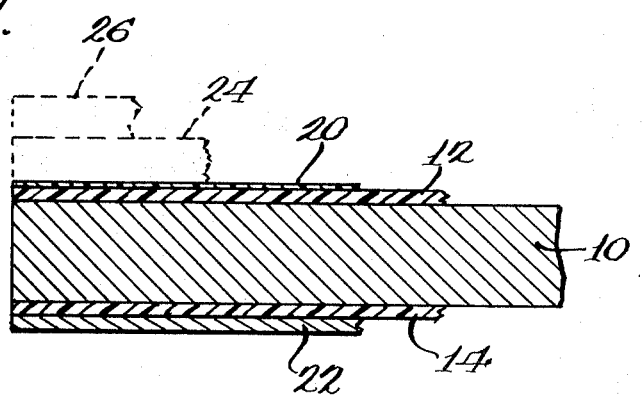
FIG. 1 is an enlarged section through a preferred embodiment of the laminate and includes a showing in phantom of a tacky adhesive material in contact with the release surface of the laminate.

Turning first to FIG. 1, the illustrated laminate comprises a heavy paper substrate 10, such as kraft paper, with plastic, usually thermoplastic such as extruded polyethylene film, layers 12 and 14 on both surfaces of substrate 10. Layer 12 is coated with a layer or coating 20 of silicone to provide a release surface. A layer of printable thin tissue paper 22 is adhesively secured to the other plastic layer 14 to provide a printable reverse surface.

In use, the laminate can function as a web for contacting, carrying and releasing a tacky surface such as the surface of a pressure-sensitive adhesive coating, such as is shown in phantom at 24 on a substrate 26, usually of Mylar or like plastic material, in the manufacture of a pressure-sensitive adhesive coated sheet. The adhesive 24 can be applied to the surface 20, the substrate 26 can be applied over coating 24 and the combined pressure-sensitive adhesive 24 and substrate 26 can be removed intact as a product. Alternatively, the assembly of release web, adhesive 24 and substrate 26 can be cut into sheets or rolled up on a takeup roll and sold as product. Operating instructions for use of the release sheet or web or combination with layers 24 and 26 can be readily printed on the printable paper surface of layer 22.

It may be expected that the use of the tissue paper surface layer in the release paper of the present invention would cause curl problems during use due to differences in moisture absorption between the paper surface and the materials applied to the release surface. This is because such materials as Mylar, which is relatively dimensionally stable to humidity changes, are used as materials for substrate 26 in the manufacture of pressure-sensitive adhesive sheets. The tissue paper, on the other hand, is moisture-absorbent and would be expected to expand relative to the Mylar and cause curl in high humidity conditions. However, surprisingly, such curl problems are minimal or non-existent with the release sheets of this invention.

The printable surface is preferably of absorbent material such as tissue paper so that when the web is wound into roll form, the tissue paper will absorb any excess silicone coating material from the release surface, reducing the possibility of transferring such coating material from the web back surface to equipment rolls and the like during use. The printable surface is also preferably more heat-resistant than polyethylene so that it can be used as a contact surface for moving the web over hot idler rolls and other heated surfaces. The layer of tissue paper further imparts increased stiffness to the sheet, making it easier to initiate separations at edges from pressure-sensitive adhesives, and provides a surface which is not absolutely smooth but has a coefficient of friction acceptable to most conventional sheet or web handling automatic equipment. The tissue also improves die cutting properties of the sheet since it provides a more cleanly cuttable last layer for the die to cut through and minimizes stringing of the polyethylene film.

The release sheets or webs of the present invention can be prepared by a simple three-step procedure. The first step involves extruding molten polyethylene between a heavy paper web and a tissue web at a chill roll. Either a smooth or matte surface chill roll can be used because the polyethylene does not form a surface of the release sheet. The tissue paper layer can be disposed against the chill roll during coating to provide proper heat transfer to chill the polyethylene and the tissue readily releases from the chill roll with no sticking problems. In the second step, the laminate from the first step is passed a second time over the chill roll and molten polyethylene is extruded between the heavy paper surface and the chill roll. A gloss or smooth surface chill roll should be used for this operation but since the same chill roll can be used in the first step of the method, there is no need to change chill rolls between steps. In the third step, the web recovered from the second step is passed through a silicone coater and drying oven to a windup roll in such manner that the exposed polyethylene surface applied in the second step is coated with the silicon coating material.

Figure 2:
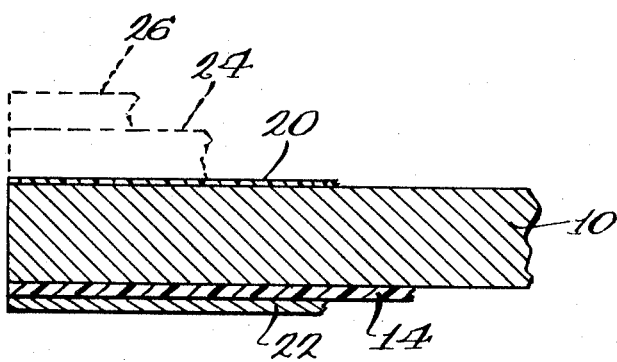
FIG. 2 is an enlarged section through another embodiment of the laminate.

FIG. 2 illustrates another form of laminate in which plastic film layer 12 of FIG. 1 is omitted. Although the laminate itself may tend to curl, when combined with the pressure sensitive adhesive coated plastic as shown in phantom at 24, 26, the plastic layer 26 tends to enhance dimensional stability to the extent preventing undue curl of the finished product by blocking entry of moisture through adhesive layer 24 and coating 20 and into paper substrate 10.

The structure of FIG. 2 can be readily manufactured more simply than in the case of the FIG. 1 structure because the second step of the above described procedure is omitted. The laminate of layers 10, 14 and 22 can be directed as a web directly from the first step chill roll to the third step silicon coating step for coating on the exposed surface of substrate 10, and then through the oven to the windup roll as a continuous one feeding process for each roll.

I claim:
1. A curl resistant release sheet for backing and releasing from a surface and which has a printable reverse surface and can be stored in roll form comprising a flexible heavy paper substrate, a first layer of plastic film on one surface of the substrate, a second layer of plastic film on the other surface of the substrate, a release coating on the surface of the first layer of plastic film, and an exposed layer of absorbent printable material on the second layer of plastic film.

2. The structure of claim 1 wherein said layer of printable material is tissue paper.

3. The structure of claim 1 wherein said plastic film is a thermoplastic film.

4. The structure of claim 3 wherein said thermoplastic is polyethylene.

5. The structure of claim 1 wherein said release coating is silicone polymer.

6. The laminate of claim 1 wherein said printable material is more heat resistant than said plastic film.

7. The laminate of claim 1 wherein said substrate is heavy paper, said printable layer is a sheet of tissue paper, said plastic film is polyethylene film extruded between the heavy paper and tissue paper and said release coating is silicone polymer.

References Cited
UNITED STATES PATENTS

| | | | |
|---|---|---|---|
| 2,606,853 | 8/1952 | Reese et al. | 161—208 X |
| 2,778,760 | 1/1957 | Hurst | 161—250 X |
| 2,909,443 | 10/1959 | Wolinski | 161—208 X |
| 3,192,100 | 6/1965 | Morgan | 161—406 X |
| 3,403,045 | 9/1968 | Erickson et al. | 161—208 X |
| 3,135,608 | 6/1964 | Dickard | 96—83 |
| 3,284,228 | 11/1966 | Ekstrom et al. | 117—65.2 |
| 3,343,663 | 9/1967 | Seidler | 161—413 X |

JOHN T. GOOLKASIAN, Primary Examiner

G. W. MOXON, II, Assistant Examiner

U.S. Cl. X.R.

161—167, 250, 406; 206—59